(12) United States Patent
Ahn

(10) Patent No.: US 11,652,233 B2
(45) Date of Patent: May 16, 2023

(54) BATTERY PACK

(71) Applicant: SAMSUNG SDI CO., LTD., Yongin-si (KR)

(72) Inventor: Sanghyeok Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/499,464

(22) PCT Filed: Jan. 29, 2018

(86) PCT No.: PCT/KR2018/001219
§ 371 (c)(1),
(2) Date: Sep. 30, 2019

(87) PCT Pub. No.: WO2018/190498
PCT Pub. Date: Oct. 18, 2018

(65) Prior Publication Data
US 2020/0028201 A1  Jan. 23, 2020

(30) Foreign Application Priority Data

Apr. 10, 2017 (KR) .................. 10-2017-0046291

(51) Int. Cl.
*H01M 10/04* (2006.01)
*H01M 50/262* (2021.01)
(Continued)

(52) U.S. Cl.
CPC ..... *H01M 10/0481* (2013.01); *H01M 50/209* (2021.01); *H01M 50/262* (2021.01);
(Continued)

(58) Field of Classification Search
CPC ............ H01M 50/40; H01M 10/0481; H01M 2220/20; H01M 50/20; H01M 50/271;
(Continued)

(56) References Cited

U.S. PATENT DOCUMENTS 9,225,035 B1 * 12/2015 Werre ............... H01M 10/0468
9,748,533 B2     8/2017 Kim et al.
(Continued)

FOREIGN PATENT DOCUMENTS

CN    101180749 A    5/2008
CN    102055003 A    5/2011
(Continued)

OTHER PUBLICATIONS

European Search Report dated Dec. 9, 2020.
(Continued)

*Primary Examiner* — Jonathan G Jelsma
*Assistant Examiner* — Omar M Kekia
(74) *Attorney, Agent, or Firm* — Lee IP Law, P.C.

(57) ABSTRACT

An embodiment of the present disclosure provides a battery pack including: a plurality of battery modules each including at least one battery cell; a housing supporting the plurality of battery modules which are arranged side by side in a first direction, the housing including a support wall that covers at least one surface of the plurality of battery modules and a barrier wall that is placed between the plurality of battery modules; a compression member provided on the housing and pressing the plurality of battery modules; and a cover coupled to the housing and covering the plurality of battery modules and the compression member.

7 Claims, 6 Drawing Sheets

(51) Int. Cl.
 *H01M 50/209* (2021.01)
 *H01M 50/271* (2021.01)
(52) U.S. Cl.
 CPC ...... *H01M 50/271* (2021.01); *H01M 2220/20* (2013.01); *Y02E 60/10* (2013.01); *Y02P 70/50* (2015.11)
(58) Field of Classification Search
 CPC ... H01M 50/262; H01M 50/209; Y02E 60/10; Y02P 70/50
 USPC .......................................................... 429/99
 See application file for complete search history.

(56) References Cited

U.S. PATENT DOCUMENTS

| | | | |
|---|---|---|---|
| 10,312,561 | B2 | 6/2019 | Park et al. |
| 2009/0104516 | A1 | 4/2009 | Yoshihara et al. |
| 2010/0119923 | A1 | 5/2010 | Wu et al. |
| 2014/0011058 | A1 | 1/2014 | Adachi et al. |
| 2014/0212724 | A1 | 7/2014 | Lee et al. |
| 2017/0012330 | A1 | 1/2017 | Kim et al. |
| 2017/0025646 | A1* | 1/2017 | Ota .................... H01M 50/103 |
| 2019/0013502 | A1 | 1/2019 | Brenner et al. |

FOREIGN PATENT DOCUMENTS

| | | |
|---|---|---|
| CN | 203367390 U | 12/2013 |
| CN | 103858253 A | 6/2014 |
| CN | 204118156 U | 1/2015 |
| CN | 105762310 A | 7/2016 |
| CN | 106058108 A | 10/2016 |
| EP | 3054500 A1 | 3/2016 |
| JP | 2016-000081857 A | 5/2016 |
| KR | 10-2004-0028351 A | 4/2004 |
| KR | 10-2013-0110246 A | 10/2013 |
| KR | 10-1425569 B1 | 7/2014 |
| KR | 10-2014-0137502 A | 12/2014 |
| KR | 10-2015-0015179 A | 2/2015 |
| KR | 10-1547395 | 8/2015 |
| KR | 10-2015-0099965 | 9/2015 |
| KR | 10-2016-0050492 | 5/2016 |
| WO | WO 2017/149146 A1 | 9/2017 |

OTHER PUBLICATIONS

International Search Report dated May 11, 2018.
Chinese Office action dated Sep. 6, 2021.
Chinese Notice of Allowance dated Jun. 3, 2022.
European Office Action dated Mar. 24, 2023.

* cited by examiner

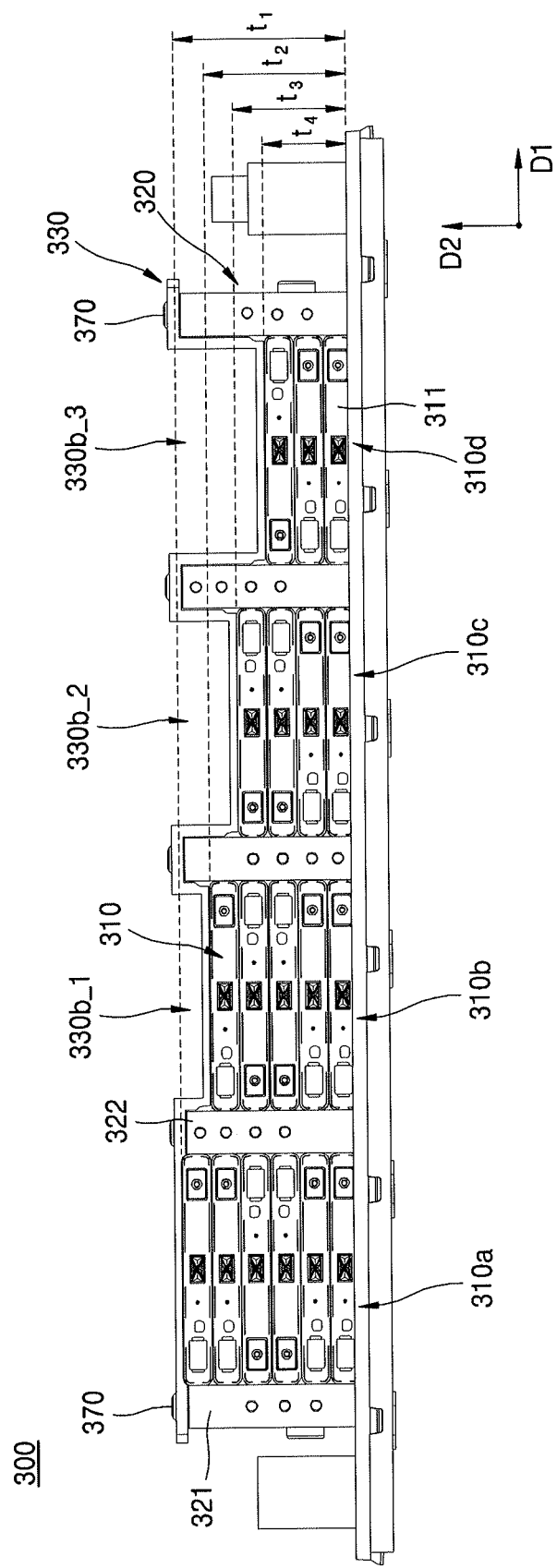

BATTERY PACK

CROSS-REFERENCE TO THE RELATED APPLICATION

This is the U.S. national phase application based on PCT Application No. PCT/KR2018/001219, filed Jan. 29, 2018, which is based on Korean Patent Application No. 10-2017-0046291, filed Apr. 10, 2017, the entire contents of all of which are hereby incorporated by reference.

TECHNICAL FIELD

Embodiments of the present disclosure relate to a battery pack.

BACKGROUND ART

In general, battery cells are used as energy sources for mobile devices, electric vehicles, hybrid vehicles, or other electric devices, and such battery cells may be modified according to the types of devices to which the battery cells are applied.

For example, small mobile devices such as cellular phones may be operated for a certain period of time by using the power and capacity of only one battery cell. However, devices such as electric vehicles or hybrid vehicles which consume large amounts of power, have long operating times, and require high-power driving may have to be used with high-capacity battery modules each formed by electrically connecting battery cells to increase power and capacity. That is, the output voltage or current of such a battery module may be adjusted by varying the number of battery cells included in the battery module. Such battery modules may be electrically connected to each other to form a battery pack.

The above-described background art is technical information that the inventor had or learned when or while deriving embodiments of the present disclosure and may not have been publicly known before the filing of the present application.

DESCRIPTION OF EMBODIMENTS

Technical Problem

Embodiments of the present disclosure may provide a battery pack in which the structure of a housing on which a plurality of battery modules are placed is improved to prevent transition of an event such as swelling or heat emission from one battery cell to the other battery cells.

Solution to Problem

An embodiment of the present disclosure provides a battery pack including: a plurality of battery modules each including at least one battery cell; a housing supporting the plurality of battery modules which are arranged side by side in a first direction, the housing including a support wall that covers at least one surface of the plurality of battery modules and a barrier wall that is placed between the plurality of battery modules; a compression member provided on the housing and pressing the plurality of battery modules; and a cover coupled to the housing and covering the plurality of battery modules and the compression member.

Advantageous Effects of Disclosure

According to embodiments of the present disclosure, the battery pack has a structure in which the battery modules are separated from each other using the barrier wall and are compressed using the compression member, and thus even when an event occurs in one of the battery modules, transition of the event to the other battery modules may be prevented.

In addition, even when more battery cells are required according to the design, sagging or twisting of the battery cells may be prevented by forming each battery module by stacking the battery cells.

However, the scope of the present disclosure is not limited to these effects.

BRIEF DESCRIPTION OF DRAWINGS

FIG. 6 is a front view illustrating another embodiment of the battery pack shown in FIG. 4.

BEST MODE

Figure 1:
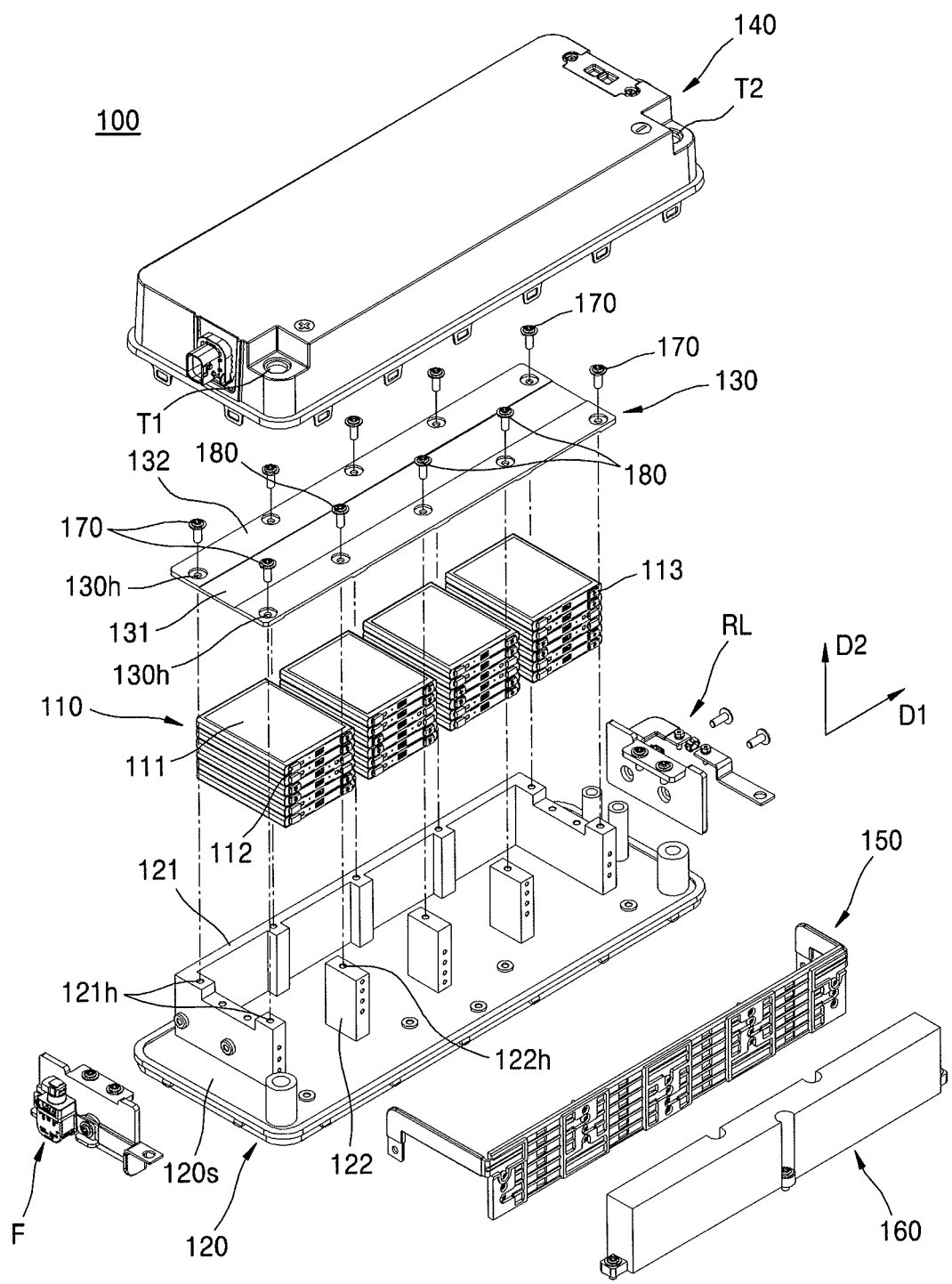
FIG. 1 is an exploded perspective view illustrating a battery pack according to an embodiment of the present disclosure.

An embodiment of the present disclosure provides a battery pack including: a plurality of battery modules each including at least one battery cell; a housing supporting the plurality of battery modules which are arranged side by side in a first direction, the housing including a support wall that covers at least one surface of the plurality of battery modules and a barrier wall that is placed between the plurality of battery modules; a compression member provided on the housing and pressing the plurality of battery modules; and a cover coupled to the housing and covering the plurality of battery modules and the compression member.

In the embodiment, the compression member may include: a contact portion that protrudes toward the plurality of battery modules, contacts the plurality of battery modules, and presses the plurality of battery modules; and a non-contact portion that does not contact the plurality of battery modules.

In the embodiment, the support wall may include a first fastening hole, the compression member may include a second fastening hole, and the support wall and the compression member may be fastened to each other by a first fixing member penetrating the first fastening hole and the second fastening hole.

In the embodiment, the compression member may include: a contact portion that protrudes toward the plurality of battery modules and contacts with the plurality of battery modules; and a non-contact portion that does not contact the plurality of battery modules, wherein the second fastening hole is formed in the non-contact portion.

In the embodiment, the barrier wall may include a third fastening hole, and the barrier wall and the compression member may be fastened to each other by a second fixing member penetrating the second fastening hole and the third fastening hole.

In the embodiment, the plurality of battery modules may be placed on the housing and may have same height.

In the embodiment, at least one of the plurality of battery modules placed on the housing may have a height different from a height of remaining battery modules.

In the embodiment, the plurality of battery modules may be placed on the housing and may have different heights from one another.

In the embodiment, the compression member may be partially bent to contact at least one of the battery modules which has a different height from remaining battery modules.

Other aspects, characteristics, and advantages will become apparent and more readily appreciated from the accompanying drawings, claims, and detailed description.

MODE OF DISCLOSURE

The present disclosure may be variously modified, and various embodiments may be provided according to the present disclosure. Hereinafter, some embodiments will be illustrated in the accompanying drawings and described in detail. Effects and features of the present disclosure, and implementation methods thereof will be clarified through the following embodiments described in detail with reference to the accompanying drawings. However, embodiments of the present disclosure are not limited to the following embodiments but may be implemented in various forms.

In the following embodiments, it will be understood that although terms such "first" and "second" are used to describe various elements, these elements should not be limited by these terms. These terms are only used to distinguish one element from another. The terms of a singular form may include plural forms unless referred to the contrary. In addition, terms such as "include" or "comprise" specify features or the presence of stated elements, but do not exclude other features or elements.

In the drawings, the sizes of elements may be exaggerated for clarity. For example, in the drawings, the size or thickness of each element may be arbitrarily shown for illustrative purposes, and thus the present disclosure should not be construed as being limited thereto.

In addition, the order of processes explained in one embodiment may be changed in a modification of the embodiment or another embodiment. For example, two consecutively described processes may be performed substantially at the same time or performed in the opposite order of the described order.

Hereinafter, embodiments of the present disclosure will be described in detail with reference to the accompanying drawings. In the following description given with reference to the accompanying drawings, the same elements or corresponding elements are denoted with the same reference numerals, and overlapping descriptions thereof will be omitted.

Figure 2:
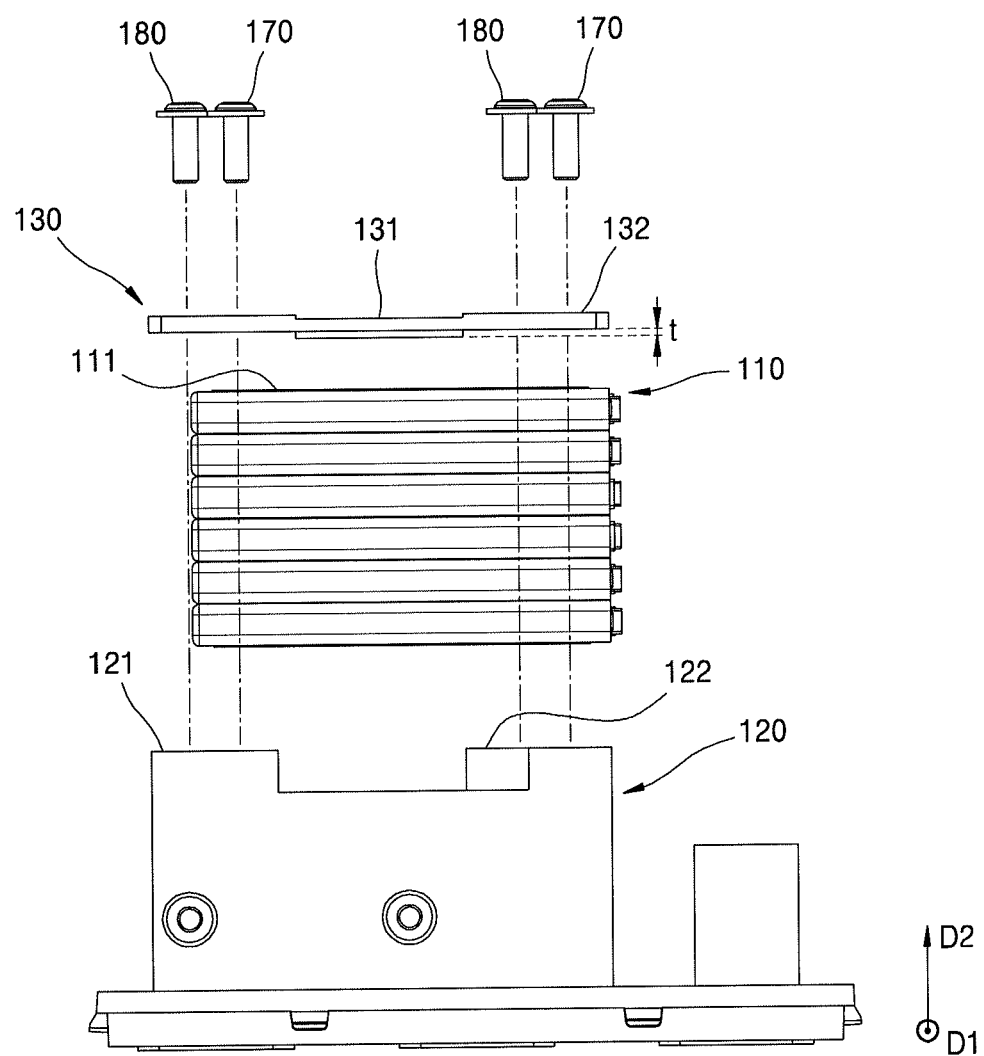
FIG. 2 is an exploded side view illustrating the battery pack of FIG. 1 after removing some elements of the battery pack.
Figure 3:
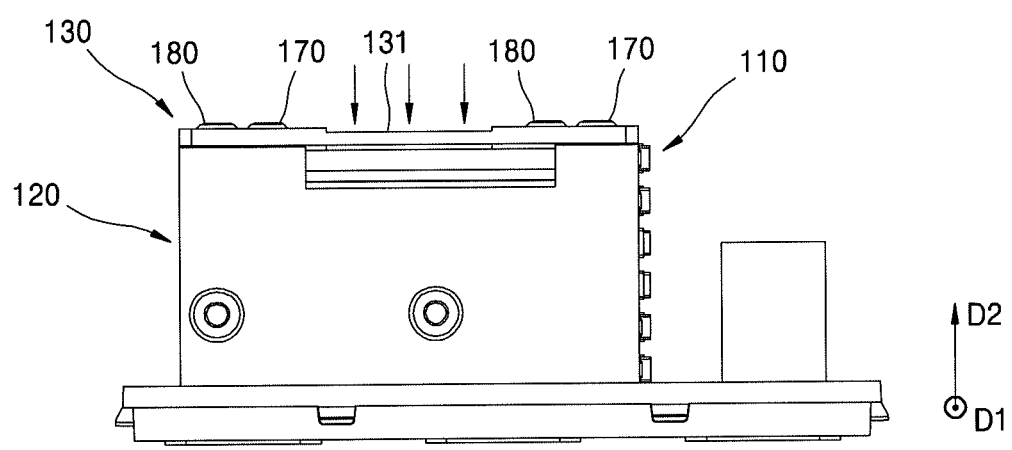
FIG. 3 is a side view illustrating the battery pack of FIG. 2 after attaching the removed elements to the battery pack.

FIG. 1 is an exploded perspective view illustrating a battery pack 100 according to an embodiment of the present disclosure, FIG. 2 is an exploded side view illustrating the battery pack 100 of FIG. 1 after removing some elements of the battery pack 100, and FIG. 3 is a side view illustrating the battery pack 100 of FIG. 2 after attaching the removed elements to the battery pack.

The battery pack 100 may include a battery module 110, a housing 120, a compression member 130, and a cover 140.

The battery module 110 is a high-voltage, large-capacity battery module having a structure in which a plurality of battery cells 111 are stacked, and a plurality of such battery modules 110 may be arranged side by side in a first direction D1 in spaces defined by support walls 121 and barrier walls 122 of the housing 120. Here, the battery cells 111 may be provided in various shapes, and the descriptions of embodiments of the present disclosure will be presented for the case in which the battery cells 111 have a prismatic shape.

Each of the battery cells 111 may have a general structure including an electrode assembly (not shown) in which a positive electrode plate (not shown) and a negative electrode plate (not shown) are arranged on both sides of a separator (not shown), and may be configured to be discharged and charged with a preset amount of electricity. In addition, a first tab 112 and a second tab 113 protrude from a side of each of the battery cells 111 at a given distance from each other. In this case, the battery cells 111 may be arranged such that the first tabs 112 and the second tabs 113 may face a side of the housing 120. That is, the battery cells 111 may be arranged on the housing 120 in a state in which wide surfaces of the battery cells 111 may face a support 120s of the housing 120.

In addition, the first tab 112 and the second tab 113 of a battery cell 111 may be electrically connected to the first tab 112 and the second tab 113 of an adjacent battery cell 111 via a bus bar 150. Here, the first tabs 112 and the second tabs 113 may have a positive polarity and a negative polarity, respectively.

As described above, since the first and second tabs 112 and 113 of each of the battery cells 111 are fastened to the bus bar 150, the battery modules 110 may be electrically connected to each other. In the battery modules 110, the battery cells 111 may be connected to each other in series or parallel as the first and second tabs 112 and 113 are fastened to the bus bar 150 as described above.

The housing 120 may support the battery modules 110 arranged side by side in the first direction D1, and may include the support walls 121 each covering at least one surface of the battery modules 110 and the barrier walls 122 arranged between the battery modules 110.

In detail, the support walls 121 and the barrier walls 122 may protrude in a second direction D2 from the support 120s facing the wide surfaces of the battery cells 111. The support walls 121 may define regions in which the battery modules 110 are arranged on the support 120s. Here, support walls 121 located on one end and the other end in the first direction D1 may cover two surfaces of the battery modules 110, and the other support wall 121 may cover one surface of each of the battery modules 110.

The compression member 130 may be provided on the housing 120 to press the battery modules 110. In detail, the compression member 130 may include: a contact portion 131 that protrudes toward the battery modules 110, contacts the battery modules 110, and presses the battery modules 110; and a non-contact portion 132 that does not contact the battery modules 110.

In addition, the support walls 121 of the housing 120 may include first fastening holes 121h, the compression member 130 may include second fastening holes 130h, and the barrier walls 122 may include third fastening holes 122h. In this structure, the support walls 121 and the compression member 130 may be coupled to each other by first fixing members 170 penetrating the first fastening holes 121h and the second fastening holes 130h, and the barrier walls 122 and the compression member 130 may be coupled to each other by second fixing members 180 penetrating the second fastening holes 130h and the third fastening holes 122h. In this case, the second fastening holes 130h may be formed in the non-contact portion 132 of the compression member 130.

The cover 140 may be coupled to the housing 120 to cover the battery modules 110 and the compression member 130, and a first terminal hole T1 and a second terminal hole T2 may be formed in the cover 140 to provide a first terminal (not shown) and a second terminal (not shown) at positions corresponding to a fuse F and a relay RL on both sides of the cover 140 in the first direction D1.

Although not shown in the drawings, the first terminal may have the same polarity as the first tabs 112, and the second terminal may have the same polarity as the second tabs 113. That is, as described above, the first tabs 112 and the second tabs 113 may be respectively electrically connected to each other through the bus bar 150, and the bus bar 150 may be electrically connected to the fuse F and the relay RL such that positive electrodes and negative electrodes of the battery modules 110 may be formed connected to the outside by the first terminal and the second terminal.

In addition, as shown in the drawings, the bus bar 150 electrically connecting the battery cells 111 to each other, and a controller 160 electrically connected to the bus bar 150 for controlling the voltage and temperature of the battery modules 110 may be coupled to the battery modules 110 at sides of the battery modules 110 at which the first tabs 112 and the second tabs 113 of the battery modules 110 are arranged.

Here, the controller 160 may be a general battery management system (BMS) and may include sensors for measuring voltages and temperatures, and thus the operation of the fuse F or the relay RL may be controlled using values measured by the sensors.

Hereinafter, the coupling structure of the battery modules 110, the housing 120, and the compression member 130 will be specifically described with reference to FIGS. 2 and 3.

FIG. 2 is an exploded side view illustrating a state in which the battery modules 110, the housing 120, and the compression member 130 are not coupled to each other, and FIG. 3 is a side view illustrating a state in which the elements shown in FIG. 2 are attached to each other.

Referring to FIGS. 2 and 3, the compression member 130 may include a contact portion 131 protruding in a direction toward the housing 120 by an amount denoted with a reference letter (t). As shown in FIG. 3, when the housing 120 and the compression member 130 are coupled to each other using the first fixing members 170 and the second fixing members 180 after placing the battery modules 110 on the housing 120, the contact portion 131 presses the battery modules 110 to an extent corresponding to the reference letter (t) (refer to arrows in FIG. 3).

Here, the thickness (t) of the contact portion 131 may be set such that the battery cells 111 may be pressed to the extend in which the battery cells 111 are brought into tight contact with each other by the pressing force of the contact portion 131. That is, the thickness (t) of the contact portion 131 may be set such that the battery cells 111 may not be broken or deformed by reaction force to excessive force applied by the contact portion 131.

In the related art, a battery module is formed by compressing a bundle of battery cells, and thus the battery cells may be unevenly compressed because of deviations between the battery cells. In other words, as the number of battery cells included in a battery pack increases, sagging and twisting of each of the battery cell increase, and thus additional components are required to structurally support the battery pack. Furthermore, a battery module formed by binding together a plurality of battery cells has a structural limitation in which when an event (such as swelling or heat emission) occurs in one of the battery cells, the event easily spreads to the other battery cells.

According to embodiments of the present disclosure, a plurality of the battery modules 110 are provided by stacking a plurality of the battery cells 111, and the battery modules 110 are separated from each other and compressed by the compression member 130 such that each of the battery modules 110 may be uniformly compressed. In addition, even when more battery cells 111 are required according to the design, sagging or twisting of the battery cells 111 may be prevented by forming a plurality of the battery modules 110 by stacking the battery cells 111.

In addition, according to embodiments of the present disclosure, even when one of the battery cells 111 swells or emits heat, it may be possible to suppress transition of such an event (swelling or heat emission) to adjacent battery cells and thus to prevent the occurrence of additional events.

In addition, according to embodiments of the present disclosure, the battery modules 110 are tightly arranged in the spaces defined by the support walls 121 and the barrier walls 122 and compressed using the compression member 130, and thus spaces for installing other elements such as the bus bar 150, the controller 160, the fuse F, and the relay RL may be compactly defined, thereby improving the assemblability of the battery pack 100.

In addition, as shown in the drawings, the wide surfaces of the battery cells 111 are placed on the support 120s of the housing 120, and thus the overall height of the battery pack 100 may be reduced to improve spatial efficiency.

In addition, the battery modules 110 of the battery pack 100 may have various heights as described below with reference to FIGS. 4 to 6 according to embodiments of the present disclosure.

Figure 4:
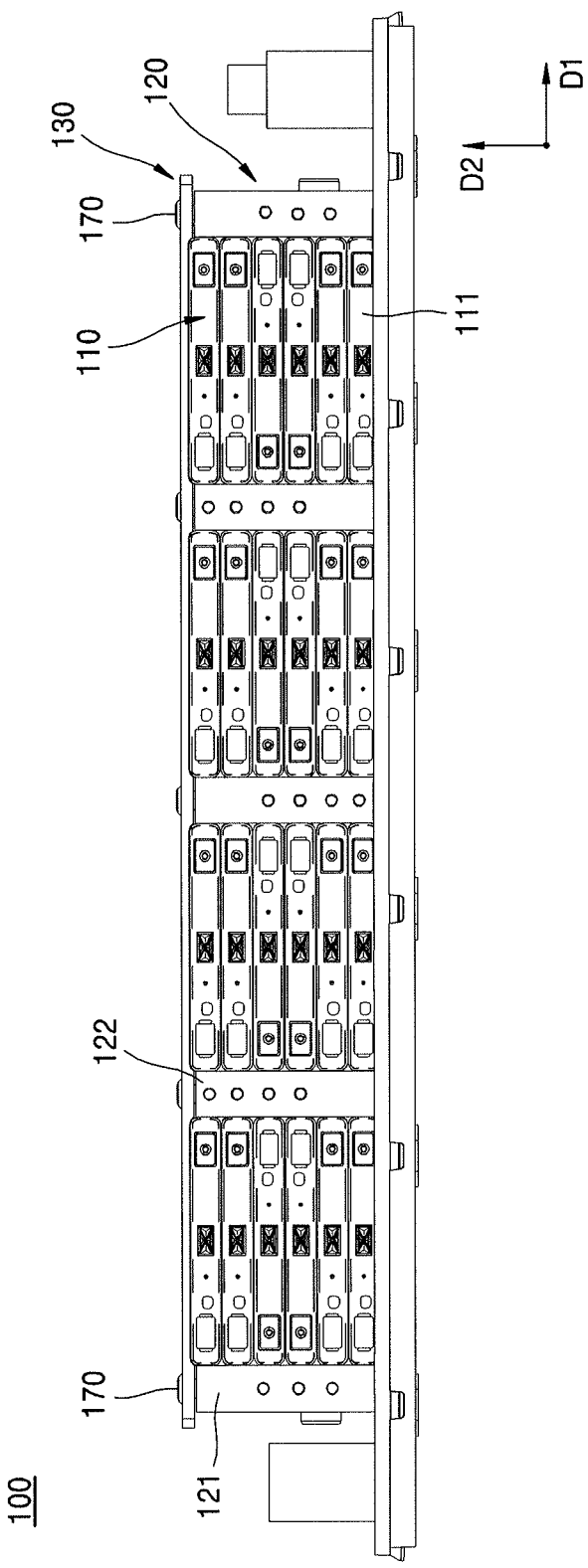
FIG. 4 is a front view illustrating the battery pack of FIG. 1 after attaching some elements to the battery pack.
Figure 5:
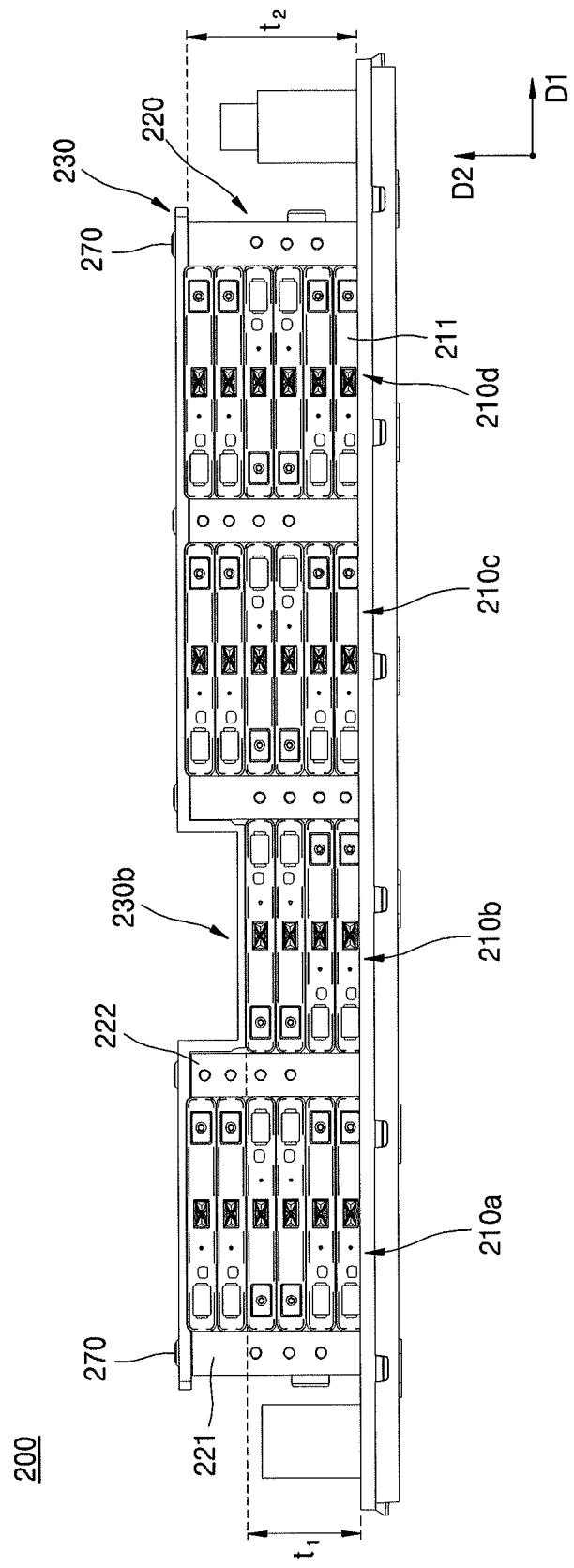
FIG. 5 is a front view illustrating another embodiment of the battery pack shown in FIG. 4.

FIG. 4 is a front view illustrating the battery pack 100 of FIG. 1 after attaching some elements to the battery pack 100, FIG. 5 is a front view illustrating another embodiment of the battery pack 100 shown in FIG. 4, and FIG. 6 is a front view illustrating another embodiment of the battery pack 100 shown in FIG. 4.

First, FIG. 4 is a front view illustrating the battery pack 100 of the embodiment of the present disclosure described with reference to FIGS. 1 to 3 when the cover 140, the bus bar 150, the controller 160, the fuse F, and the relay RL are not attached to the battery pack 100.

Referring to FIG. 4, each of the battery modules 110 may include six battery cells 111, but embodiments of the present disclosure are not limited thereto. That is, each of the battery module 110 may include one or more battery cells 111. For example, FIG. 4 shows that the battery modules 110 placed on the housing 120 may have the same height. That is, the battery pack 100 of the embodiment of the present disclosure may include the battery modules 110 which are configured to have the same height in the second direction D2, and as described above, the battery modules 110 may be arranged side by side in the first direction D1 in a state in which the battery modules 110 are pressed against the housing 120 by the compression member 130.

In addition, FIG. 5 illustrates an example in which a plurality of battery modules 210a, 210b, 210c, and 210d are installed on a housing 220, and the height t1 of one (the battery module 210b) of the battery modules 210a, 210b, 210c, and 210d is different from the height t2 of the other battery modules 210a, 210c, and 210d. In this case, for example, the battery module 210b having the different height t1 may have fewer battery cells 211 than the other battery modules 210a, 210c, and 210d.

Furthermore, in this case, a compression member 230 may have a bent portion 230b formed by partially bending the compression member 230 to press the battery module 210b having a height different from the height of the other battery modules 210a, 210c, and 210d. That is, the compression member 230 may be partially bent to contact the battery module 210b having a height different from the height of the other battery modules 210a, 210c, and 210d.

In addition, FIG. 6 illustrates a plurality of battery modules 310a, 310b, 310c, and 310d which have different heights t1, t2, t3, and t4, and are installed on a housing 320. That is, the battery modules 310a, 310b, 310c, and 310d may have different heights t1, t2, t3, and t4. Even in this case, a compression member 330 may be bent to contact the battery modules 310a, 310b, 310c, and 310d having different heights. That is, the compression member 330 shown in FIG. 6 may have a first bent portion 330b_1, a second bent portion 330b_2, and a third bent portion 330b_3 that are bent toward the battery modules 310a, 310b, 310c, and 310d and have different depths.

However, even in this case, barrier walls 322 may have the same height. That is, the housings 120, 220, and 320 which form frames of battery packs 100, 200, and 300 may be used without changes from the originally fabricated state, but the numbers of battery cells 111, 211, and 311 to be installed on the housings 120, 220, and 320 may be adjusted. Therefore, battery modules 110, 210, and 310 having various heights may be provided, and in this case, the compression members 130, 230, and 330 having various shapes as shown in FIGS. 4 to 6 for respectively contacting and pressing the battery modules 110, 210, and 310 according to the heights of the battery modules 110, 210, and 310 may be prepared and coupled to the housings 120, 220, and 320 to provide the battery packs 100, 200, and 300.

While embodiments of the present disclosure have been described with reference to the accompanying drawings, these embodiments are for illustrative purposes only, and it will be understood by those of ordinary skill in the art that various changes and modifications may be made therefrom. Therefore, the scope and spirit of the present disclosure should be defined by the following claims.

INDUSTRIAL APPLICABILITY

As described above, according to the one or more of the embodiments of the present disclosure, the battery pack has a structure in which the battery modules are separated from each other by the barrier walls and are compressed by the compression member, and thus even when an event occurs in one battery module, transition of the event to the other battery modules may be prevented.

The invention claimed is:

1. A battery pack, comprising:
a housing, battery cells in the housing and compressed by a compression member, and a cover coupled to the housing, wherein:
the battery cells are prismatic battery cells each having an electrode tab side, a bottom side, two first sides, and two second sides, the two first sides each being larger in area than the two second sides, and the two first sides joining the two second sides,
the battery cells are arranged in stacks that each comprise more than one battery cell, battery cells in each stack being arranged such that each battery cell in the stack has a first side that is in contact with a first side of an adjacent battery cell in the stack,
the stacks are arranged such that the second sides of the battery cells in each stack are face the second sides of the battery cells in an adjacent stack,
the housing comprises a first support wall and a second support wall, the first and second support walls being disposed apart in a first direction, with all of the stacks being between the first support wall and the second support wall,
the housing comprises a barrier wall that is placed between each stack and proximate to the second sides of the battery cells in the stacks on each side of the barrier wall,
the compression member is fixed to the first and second support walls by respective first fixing members,
the compression member is fixed to the barrier wall by a second fixing member, and
the compression member directly contacts a single battery cell in each stack, and is configured to compress the stacks in a second direction, the second direction being orthogonal to the first direction, the compression member comprising:
a contact portion that protrudes toward and presses each of the stacks, the contact portion directly contacting a single battery cell in each stack and being configured such that the battery cells in each stack are brought into tight contact with each other by a pressing force of the contact portion; and
a non-contact portion that does not contact any of the stacks.

2. The battery pack of claim 1, wherein the first and second fixing members penetrate the non-contact portion.

3. The battery pack of claim 1, wherein the stacks all have a same height.

4. The battery pack of claim 1, wherein at least one of the stacks has a height different from a height of an adjacent stack.

5. The battery pack of claim 4, wherein all the stacks have different heights from one another.

6. The battery pack of claim 4, wherein the compression member is partially bent to be in contact with all of the stacks.

7. The battery pack as claimed in claim 1, wherein:
the electrode tab sides of all of the battery cells face orthogonal to the first and second directions.

* * * * *